United States Patent
Babella et al.

(10) Patent No.: US 7,904,701 B2
(45) Date of Patent: Mar. 8, 2011

(54) ACTIVATING A DESIGN TEST MODE IN A GRAPHICS CARD HAVING MULTIPLE EXECUTION UNITS TO BYPASS A HOST CACHE AND TRANSFER TEST INSTRUCTIONS DIRECTLY TO AN INSTRUCTION CACHE

(75) Inventors: Anthony Babella, Salida, CA (US); Allan Wong, Folsom, CA (US); Lance Cheney, Davis, CA (US); Brian D. Rauchfuss, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 11/759,840

(22) Filed: Jun. 7, 2007

(65) Prior Publication Data
US 2008/0307261 A1  Dec. 11, 2008

(51) Int. Cl.
*G06F 9/00* (2006.01)
*G06F 11/00* (2006.01)
(52) U.S. Cl. .................................. 712/227; 714/30
(58) Field of Classification Search .............. 712/227; 714/25, 30
See application file for complete search history.

(56) References Cited

U.S. PATENT DOCUMENTS

| | | | |
|---|---|---|---|
| 5,210,864 A | 5/1993 | Yoshida | |
| 5,226,149 A | 7/1993 | Yoshida et al. | |
| 5,377,200 A | 12/1994 | Pedneau | |
| 5,630,157 A | 5/1997 | Dwyer, III | |
| 5,732,209 A * | 3/1998 | Vigil et al. | 714/30 |
| 6,088,823 A | 7/2000 | Ayres et al. | |
| 6,385,747 B1 * | 5/2002 | Scott et al. | 714/724 |
| 6,421,794 B1 | 7/2002 | Chen et al. | |
| 6,760,865 B2 | 7/2004 | Ledford et al. | |
| 6,925,584 B2 | 8/2005 | Padwekar et al. | |
| 6,975,954 B2 | 12/2005 | Mak et al. | |
| 7,139,954 B1 * | 11/2006 | Korhonen | 714/736 |
| 7,149,921 B1 | 12/2006 | Zorian et al. | |
| 7,185,295 B2 | 2/2007 | Park et al. | |
| 7,213,170 B2 * | 5/2007 | Shidla et | 714/30 |
| 7,290,289 B2 * | 10/2007 | Janke et al. | 726/34 |
| 2007/0011535 A1 | 1/2007 | Anzou et al. | |
| 2009/0024876 A1 | 1/2009 | Arora et al. | |
| 2009/0024892 A1 | 1/2009 | Bussa et al. | |
| 2009/0177445 A1 | 7/2009 | Capps, Jr. et al. | |
| 2009/0198964 A1 | 8/2009 | Xiao et al. | |

OTHER PUBLICATIONS

Carbine, A., and D. Feltham, "Pentium Pro Processor Design for Test and Debug", IEEE Design and Test of Computers, vol. 15, Issue 3, Jul.-Sep. 1998, pp. 77-82.

(Continued)

*Primary Examiner* — David J Huisman
(74) *Attorney, Agent, or Firm* — Konrad Raynes & Victor LLP; David W. Victor

(57) ABSTRACT

Provided are a method and system for activating a design test mode in a graphics card having multiple execution units. A design test mode is activated in a graphics module comprising multiple execution units coupled to a cache on a bus. The bus is configured to return test instructions from the cache to the execution units in response to a request from one execution unit for the test instructions from the cache in the design test mode. The execution units execute the test instructions during the design test mode. Interrupts are prevented during the design test mode.

12 Claims, 6 Drawing Sheets

OTHER PUBLICATIONS

McGuire, M., "The G3D Graphics Engine: Advanced Language Features for Simplicity and Safety in a Graphics API", [online], Nov. 1, 2004, [retrieved on Apr. 27, 2007], retrieved from the Internet at <URL: http://www.ddj.com/dept/cpp/184401883>, 6 pp.

Parvathala, P., K. Maneparambil, and W. Lindsay, "FRITS- A Microprocessor Functional BIST Method", Proceedings of the 2002 IEEE International Test Conference, Paper 21.3, 2002, pp. 590-598.

US Patent Application, filed on Jun. 7, 2007, entitled "Loading Test Data Into Execution Units in a Graphics Card to Test the Execution Units", invented by A. Wong, K. Yin, N. Matam, A. Babella, & W.H. Wong.

US Patent Application, filed on Jun. 7, 2007, entitled "Checking Output from Multiple Execution Units", invented by A. Wong and L. Cheney.

Wu, D.M., M. Lin, M. Reddy, T. Jaber, A. Sabbavarapu, & L. Thatcher, "An Optimized DFT and Test Pattern Generation Strategy for an Intel High Performance Microprocessor", Proceedings of the 2004 IEEE International Test Conference, Paper 2.3, 2004, pp. 38-47.

Ricchetti, M., "Preliminary Outline of the IEEE P1500 Scaleable Architecture for Testing Embedded Cores", IEEE P1500 Architecture Task Force, 1999, 11 pp.

* cited by examiner

ACTIVATING A DESIGN TEST MODE IN A GRAPHICS CARD HAVING MULTIPLE EXECUTION UNITS TO BYPASS A HOST CACHE AND TRANSFER TEST INSTRUCTIONS DIRECTLY TO AN INSTRUCTION CACHE

BACKGROUND OF THE INVENTION

1. Field of the Invention

The present invention relates to a method, system, and program for activating a design test mode in a graphics card having multiple execution units.

2. Description of the Related Art

A graphics card comprises a component of a computer system that generates and outputs images to a display device. The graphics card may comprise an expansion card inserted in an expansion slot of the computer system or implemented as a chipset on the computer motherboard. The graphics card contains one or more graphics processors and an on-board graphics memory. Current graphics processors operate at a clock rate oscillating between 250 MHz and 650 MHz and include pipelines (vertex and fragment shaders) that translate a three dimensional (3D) image formed by vertexes, with optional colors, textures, and lighting properties and lines, into a two-dimensional (2D) image formed by pixels.

During manufacturing, the manufacturer tests produced graphics cards by inputting test data into the cards to produce test output to analyze and debug the graphics card as part of product development and quality assurance. Certain graphics cards include special test circuitry implemented on the graphics card that is used to test the memory of the graphics card.

DETAILED DESCRIPTION

Figure 1:
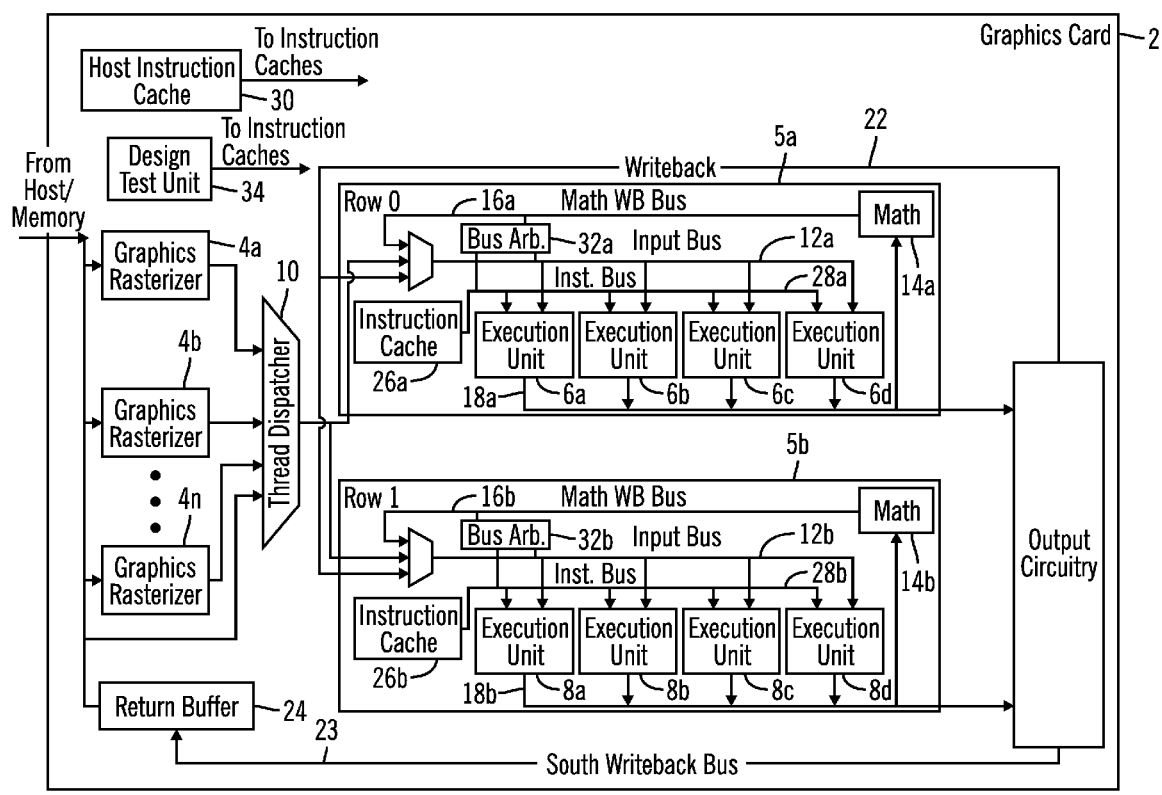
FIG. 1 illustrates an embodiment of components on a graphics card.

FIG. 1 illustrates an embodiment of components on a graphics card 2 to render images to output on a display device. The graphics card 2 includes a plurality of graphics rasterizers 4a, 4b . . . 4n that are provided three-dimensional (3D) images to render into a two-dimensional (2D) image for display on an output device. Each graphics rasterizer 4a, 4b . . . 4n may be dedicated to a specific aspect of the rendering operation. The graphics rasterizers 4a, 4b . . . 4n may offload certain computational operations to a computational engine, which may be implemented in one or more rows 5a, 5b of execution units 6a, 6b, 6c, 6d and 8a, 8b, 8c, 8d. Although two rows 5a, 5b are shown, in certain embodiments, there may be only one row or more than two rows in the graphics card 2. To offload computational operations, the graphics rasterizers 4a, 4b . . . 4n dispatch the computational operation to a thread dispatcher 10, which then dispatches one or more threads to perform the computational request over one of the input busses 12a, 12b to one or more of the execution units 6a, 6b, 6c, 6d, 8a, 8b, 8c, 8d to process. The execution units 6a, 6b, 6c, 6d, 8a, 8b, 8c, 8d may offload certain of their operations to a math function 14a, 14b. Output from the math function 14a, 14b is returned to one of the execution units 6a, 6b, 6c, 6d, 8a, 8b, 8c, 8d to process via a corresponding math writeback bus 16a, 16b.

The execution units 6a, 6b, 6c, 6d, 8a, 8b, 8c, 8d output the results of their computational operations on output busses 18a, 18b to output circuitry 20, which may comprise buffers, caches, etc. Output from the execution units 6a, 6b, 6c, 6d, 8a, 8b, 8c, 8d provided to the output circuitry 20 may be returned to the execution units 6a, 6b, 6c, 6d, 8a, 8b, 8c, 8d via a writeback bus 22 or returned to the graphics rasterizers 4a, 4b . . . 4n or thread dispatcher 10 via a south writeback bus 23 and return buffer 24.

Each row 5a, 5b includes an instruction cache 26a, 26b, respectively, to store instructions that the execution units 6a, 6b, 6c, 6d, 8a, 8b, 8c, 8d fetch via one of the instruction busses 28a, 28b. Instructions may be loaded into the instruction cache 26a, 26b from a host instruction cache 30 that receives instructions from a host cache or other memory. Each row 5a, 5b further includes one or more bus arbitrators 32a, 32b to manage operations on the busses 16a, 16b, 12a, 12b, 28a, 28b by controlling how bus requests may be blocked or directed.

The graphics card 2 further includes a design test unit 34 that configures the circuitry to concurrently load the same test instructions into the execution units 6a, 6b, 6c, 6d, 8a, 8b, 8c, 8d to simultaneously execute test operations to produce test output stored transferred to the output circuitry 20 for further output to a debugging program or unit for debugging analysis or quality assurance analysis of the graphics card unit.

Figure 2:
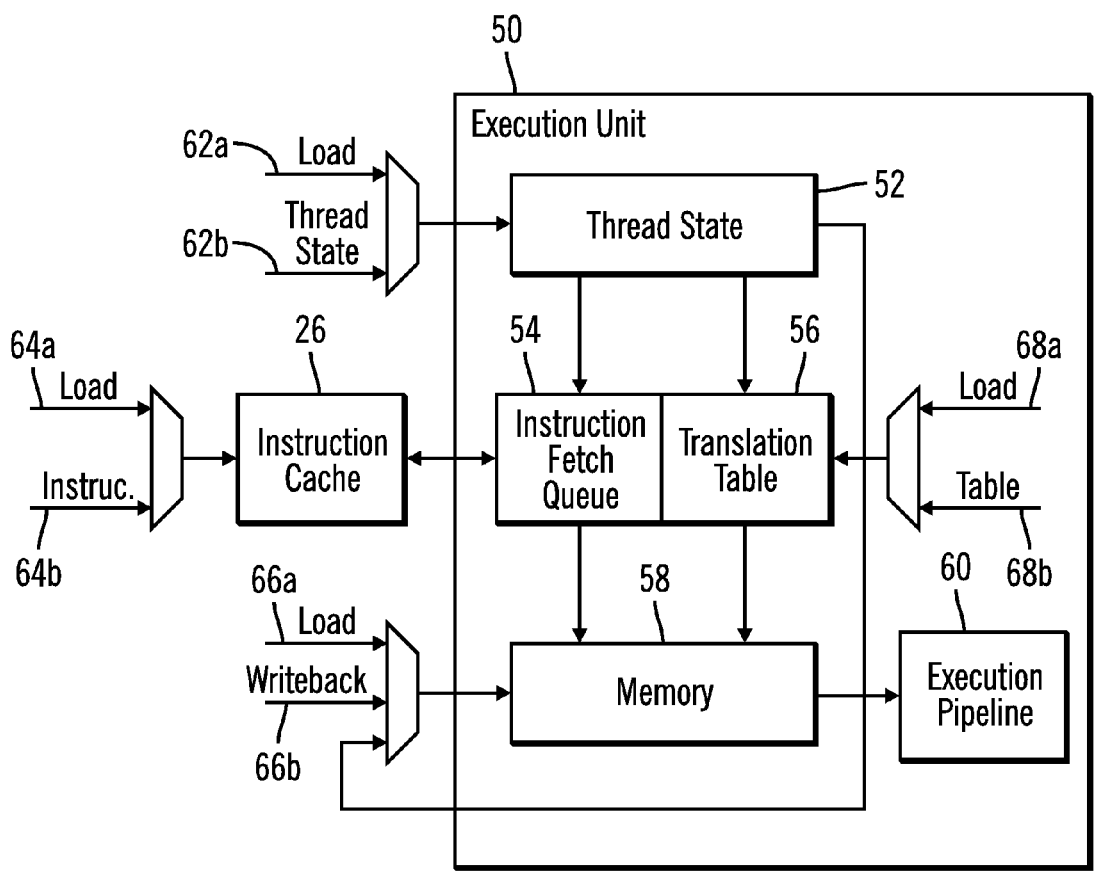
FIG. 2 illustrates an embodiment of components in an execution unit.

FIG. 2 illustrates an embodiment of components in an execution unit 50, which in one embodiment comprises an implementation of the execution units 6a, 6b, 6c, 6d, 8a, 8b, 8c, 8d, and the instructions, threads, translation tables, data, etc loaded into the execution unit 50. The execution units 6a, 6b, 6c, 6d, 8a, 8b, 8c, 8d may comprise computation cores, processors, etc. The execution unit 50 includes a thread state unit 52, a fetch queue 54, a translation table 56, a memory 58, and an execution pipeline 60. The thread state unit 52 buffers thread state control information used by the execution unit 50 to execute threads. The thread state unit 52 may buffer threads from the thread dispatcher 10. Certain thread states need to be loaded prior to the execution unit 50 execution, such as an instruction pointer, data mask, floating point mode, and thread priority. The execution unit 50 may clear and set bits in the thread state unit 52 during execution to reflect changes in the executed thread state.

The instruction fetch queue 54 fetches instructions from the instruction cache 26a, 26b, shown as instruction cache 26 in FIG. 2, to execute via the instruction bus 28a, 28b. The translation table 56 is used to allocate space in a memory 58 and to map logical addresses to physical locations in the memory 58. The translation table 56 is loaded prior to loading instructions and data in the memory 58 and before testing and other operation execution. The memory 58 comprises the main storage for payload or data of the execution unit 50. Input data for instructions and the output of computations are stored in the memory 58. The execution unit 50 further includes paths 62a and 62b over which thread state information is concurrently loaded into the thread state unit 52, paths 64a, 64b over which same instructions are concurrently loaded into the instruction caches 26a, 26b, paths 66a, 66b over which same data is concurrently loaded into the memory 58. Paths 68a, 68b are used to load translation table data to the translation table 56. In one embodiment, paths 62a, 64a, 66a, 68a are used to load test related instructions and data used during design testing operations and paths 62b, 64b, 66b, 68b are used to load data and instructions during normal graphics processing operations.

Figure 3:
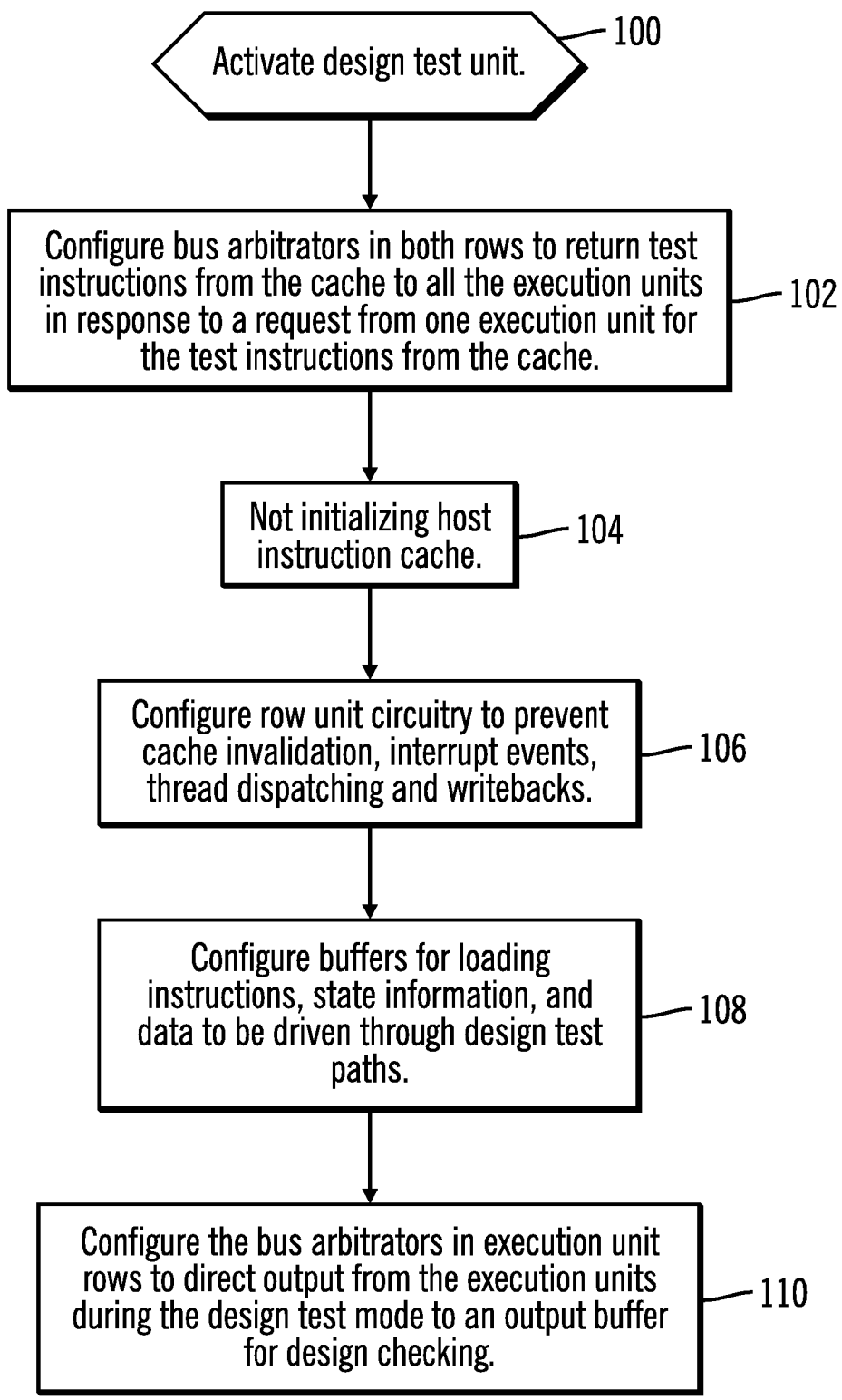
FIG. 3 illustrates an embodiment of operations to activate design test mode in the graphics card.

FIG. 3 illustrates an embodiment of operations performed to activate the design test mode to test the operations of the execution units 6a, 6b, 6c, 6d, 8a, 8b, 8c, 8d. At block 100, the design test unit 34 is activated. The design test unit 34 may be activated through registers. The design test unit 34 configures (at block 102) the bus arbitrators 32a, 32b in both rows 5a, 5b to return test instructions from the cache 26a, 26b to each of the execution units 6a, 6b, 6c, 6d, 8a, 8b, 8c, 8d in their respective rows 5a, 5b in response to a request from one execution unit for the test instructions from the cache. In one embodiment, the bus arbitrators 32a, 32b only return instructions from the instruction cache 26a, 26b to all the execution units 6a, 6b, 6c, 6d, 8a, 8b, 8c, 8d in response to an instruction request from the first execution unit 6a, 8a in each row 5a, 5b. In certain embodiments, the concurrent returning of test instructions to all the execution units 6a, 6b, 6c, 6d, 8a, 8b, 8c, 8d is performed concurrently on the same clock cycles so the execution units 6a, 6b, 6c, 6d, 8a, 8b, 8c, 8d perform the same operations at the same time, i.e., in lock step on the same clock cycles.

The host instruction cache 30 is not initialized (at block 104), such that instructions may only be loaded into the execution units 6a, 6b, 6c, 6d, 8a, 8b, 8c, 8d during design test mode operations from the instruction cache 26a, 26b. The design test unit 34 configures (at block 106) the row unit 5a, 5b to prevent cache invalidation, interrupt events, thread dispatching, and writebacks during design test mode operations, so that such prevented operations will not interfere or interrupt the execution units 6a, 6b, 6c, 6d, 8a, 8b, 8c, 8d from concurrently processing test instructions. Such operations may be prevented by gating these functions so they remain in an idle mode. The design test unit 34 configures (at block 108) buffers for loading instructions, state information, and data to be driven through design test paths 62a, 64a, 66a, 68a. The design test unit 34 also configures (at block 110) the bus arbitrators 32a, 32b in the execution unit rows 5a, 5b to direct output from the execution units 6a, 6b, 6c, 6d, 8a, 8b, 8c, 8d during the design test mode to an output buffer in the output circuitry 20 for debugging and testing of the execution units.

As a result of the activation operations of FIG. 3, the rows 5a, 5b of the execution units 6a, 6b, 6c, 6d, 8a, 8b, 8c, 8d are concurrently initialized to operate so that they concurrently perform the same operations on the same clock cycles, i.e., in lock step, to produce output also on the clock cycles to all operate in lock-step. Further, the operations of FIG. 3 disable any functions on the graphics card 2 that could interfere or interrupt the execution units 6a, 6b, 6c, 6d, 8a, 8b, 8c, 8d during test mode operation and cause them to execute operations in a non-concurrent manner, where the same operations are performed on different clock cycles.

Figure 4:
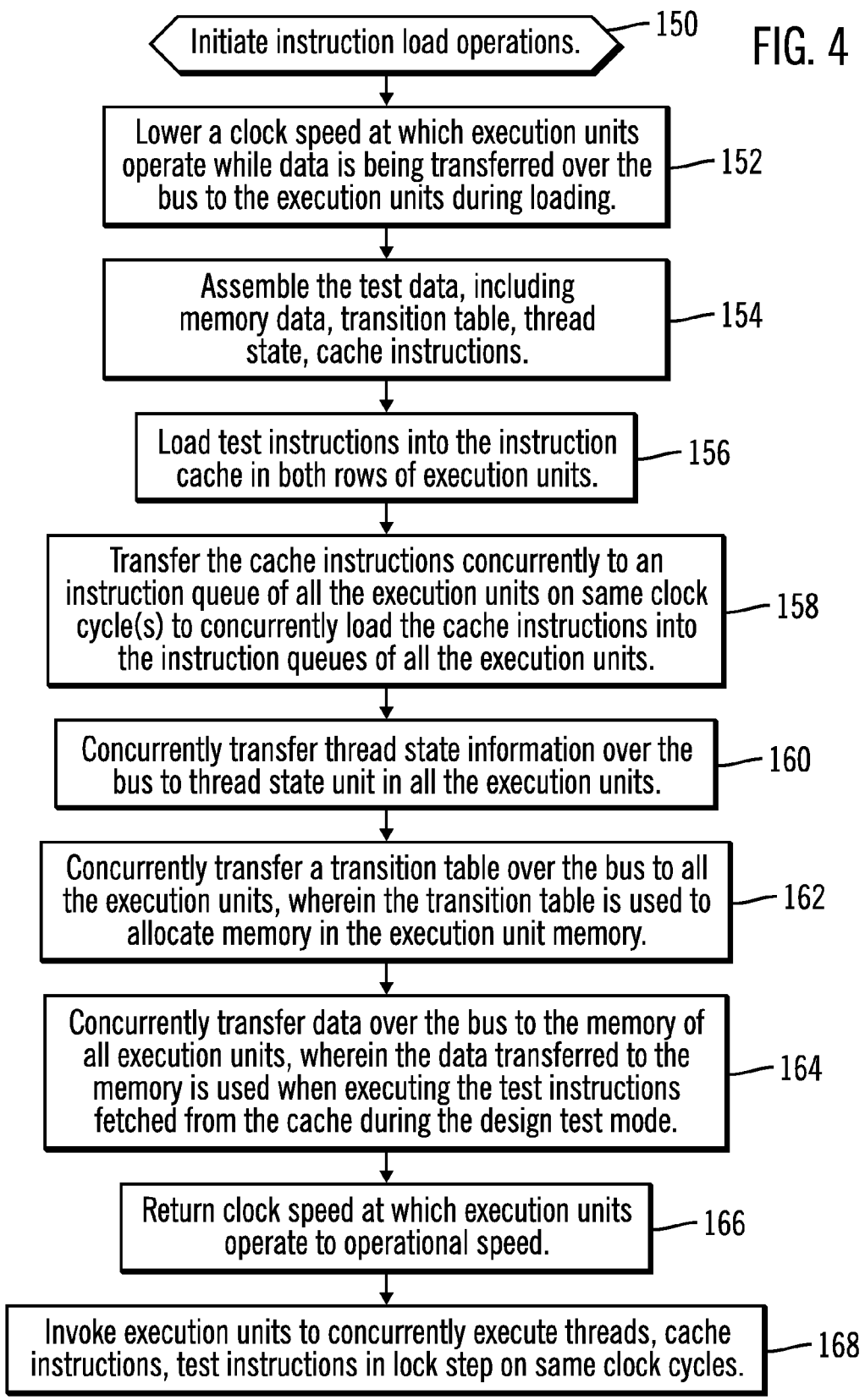
FIG. 4 illustrates an embodiment of operations to load test data into the execution units for the design test mode.

FIG. 4 illustrates an embodiment of operations to load test data, including thread state, test instructions, translation tables, etc. into the execution units 6a, 6b, 6c, 6d, 8a, 8b, 8c, 8d for design test mode operations. At block 150, the design test unit 34 initiates load operations after completing the activation operations of FIG. 3. Alternatively, certain of the activation operations may be performed during the loading operations. Before transferring test data to the execution units 6a, 6b, 6c, 6d, 8a, 8b, 8c, 8d, the design test unit 34 configures (at block 152) the execution units 6a, 6b, 6c, 6d, 8a, 8b, 8c, 8d to operate at a lower clock speed than their normal graphics operation clock speed while transfer related data and instructions are concurrently being transferred over the instruction busses 28a, 28b to load into the execution units 6a, 6b, 6c, 6d, 8a, 8b, 8c, 8d. In one embodiment, the design test unit 34 overrides a phased lock loop (PLL) render post divider select circuitry to lower the render clock of the execution units 6a, 6b, 6c, 6d, 8a, 8b, 8c, 8d to match an external clock reference. This clock gating is used to prevent problems that may occur between the loading and execution phases of the testing.

The design test unit 34 assembles (at block 154) test data, including memory data, translation tables, thread state, cache instructions for the execution units 6a, 6b, 6c, 6d, 8a, 8b, 8c, 8d. The design test unit 34 loads (at block 156) test instructions into the instruction cache 26a, 26b in both rows 5a, 5b of execution units over the test load 64a path. The cache instructions are transferred (at block 158) concurrently to an instruction queue of all the execution units on same clock cycle(s) to concurrently load the cache instructions into the instruction queues of all the execution units. The design test unit 34 concurrently transfers (at block 160) thread state information over the bus to the thread state unit 52 of all the execution units 6a, 6b, 6c, 6d, 8a, 8b, 8c, 8d via the load path 62a. All the execution units 6a, 6b, 6c, 6d, 8a, 8b, 8c, 8d may receive the same thread state information at the same time to concurrently load the same thread state information into the thread state units 52 of all the execution units execution unit. The design test unit 34 further concurrently transfers (at block 162) a translation table over the bus to all the execution units to store in the translation table 56 circuitry via the load path 68a. The design test unit 34 also transfers (at block 164) test related data over the bus 12a, 12b to the memory 58 of all the execution units 6a, 6b, 6c, 6d, 8a, 8b, 8c, 8d at the same time to use when executing test related instructions retrieved from the instruction cache 26a, 26b. In one embodiment, when concurrently transferring the test data over the input bus 12a, 12b via the load paths 62a, 64a, 66a, and 68a to the components in the execution units 6a, 6b, 6c, 6d, 8a, 8b, 8c, 8d, the same instructions, data, tables, thread state, etc., are concurrently transferred on a same clock cycle(s) to all the execution units so that the same test data is concurrently transferred to the execution units 6a, 6b, 6c, 6d, 8a, 8b, 8c, 8d at the same time, i.e., in lock step.

After concurrently loading all the test data into the execution units 6a, 6b, 6c, 6d, 8a, 8b, 8c, 8d, the design test unit 34 configures (at block 166) the clock speed at which execution units 6a, 6b, 6c, 6d, 8a, 8b, 8c, 8d operate to their normal graphics operation speed. The design test unit 34 may then concurrently invoke (at block 168) the execution units 6a, 6b, 6c, 6d, 8a, 8b, 8c, 8d to concurrently execute threads, cache instructions, test instructions, etc., where the execution units 6a, 6b, 6c, 6d, 8a, 8b, 8c, 8d process the same instructions or data on same clock cycles, i.e., in lock step. The execution units 6a, 6b, 6c, 6d, 8a, 8b, 8c, 8d may then load the received cache instructions into their instruction queues 54 (FIG. 2). The execution units 6a, 6b, 6c, 6d, 8a, 8b, 8c, 8d all concurrently process the cache instructions to access instructions from the instruction cache 26 to execute.

Described embodiments provide techniques to concurrently load test data into all the execution units and configure the graphic card circuitry to prevent interrupts and other functions from interfering with the execution units during design test mode operations. In the described embodiments, the graphics card is configured to allow test data to be concurrently loaded into the execution units, where the same test data is loaded into all the execution units on a same clock cycle(s). Further, the execution units execute same test instructions from the instruction caches on same clock cycles and output test result data on the same clock cycles so that the operations are performed in lock step.

Figure 5:
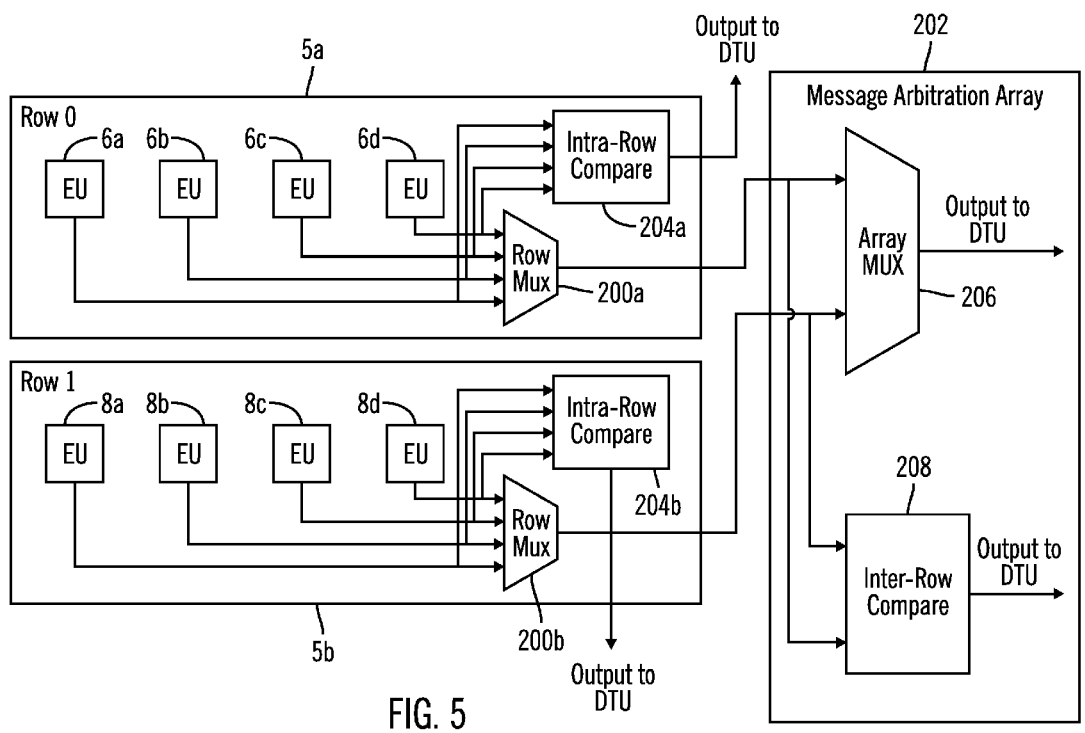
FIG. 5 illustrates an embodiment of further components on the graphics card.

FIG. 5 illustrates an embodiment of further components on the graphics card 2 of FIG. 1, where the rows 5*a*, 5*b* of execution units 6*a*, 6*b*, 6*c*, 6*d*, 8*a*, 8*b*, 8*c*, 8*d* each include a row multiplexer (MUX) 200*a*, 200*b* that receives the output from each of the execution units 6*a*, 6*b*, 6*c*, 6*d*, 8*a*, 8*b*, 8*c*, 8*d* and forwards an output signal to a message arbitration array 202, which may be implemented in the output circuitry 20 of FIG. 1. The output from the execution units 6*a*, 6*b*, 6*c*, 6*d*, 8*a*, 8*b*, 8*c*, 8*d* may comprise the cache request to the instruction cache 26*a*, 26*b*, message output controls to the bus arbitrator 32*a*, 32*b*, and computational output of the execution units 6*a*, 6*b*, 6*c*, 6*d*, 8*a*, 8*b*, 8*c*, 8*d*, which may include floating point unit (FPU) output.

Output from the execution units 6*a*, 6*b*, 6*c*, 6*d*, 8*a*, 8*b*, 8*c*, 8*d* is further forwarded to an intra-row compare unit 204*a*, 204*b* that compares the output from the execution units 6*a*, 6*b*, 6*c*, 6*d*, 8*a*, 8*b*, 8*c*, 8*d* for one row 5*a*, 5*b* to determine whether the output matches. If the execution units 6*a*, 6*b*, 6*c*, 6*d*, 8*a*, 8*b*, 8*c*, 8*d* are operating properly, then they are performing the same computations and generating the same output on the same clock cycles. Thus, the output from the execution units in one row 5*a*, 5*b* is correct if the output from all the execution units in that row matches. If the output does not match, then there is an error because the execution units in one row 5*a*, 5*b* are not producing the same output on the same clock cycles as intended. Thus, the intra-row compare units 204*a*, 204*b* determine whether the execution units for one row 5*a*, 5*b* are operating properly. The output from the intra-row compare units 204*a*, 204*b* may be forwarded to the design test unit (DTU) 34 for further analysis.

In one embodiment, the row MUXes 200*a*, 200*b* each forward their output to an array MUX 206 that may forward the output to the design test unit 34. Further, the output of the row MUXes 200*a*, 200*b* is further forwarded to an inter-row compare unit 208 which determines whether the output from the execution units 6*a*, 6*b*, 6*c*, 6*d*, 8*a*, 8*b*, 8*c*, 8*d* from the different rows 5*a*, 5*b* match. If the execution units in one row 5*a*, 5*b* are operating correctly, then they are processing the same cache instructions and generating the same computational output on the same clock cycles, which results in the output from the different rows matching. Thus, a failure of a match across execution units 6*a*, 6*b*, 6*c*, 6*d*, 8*a*, 8*b*, 8*c*, 8*d* in the different rows 5*a*, 5*b* indicates an operational error of the execution units 6*a*, 6*b*, 6*c*, 6*d*, 8*a*, 8*b*, 8*c*, 8*d*. If the output from different rows does not match, then there is an error because each of the rows 5*a*, 5*b* is not producing the same output on the same clock cycles. The output from the inter-row compare unit 208 may be forwarded to the design test unit 34 for further analysis.

Figure 6:
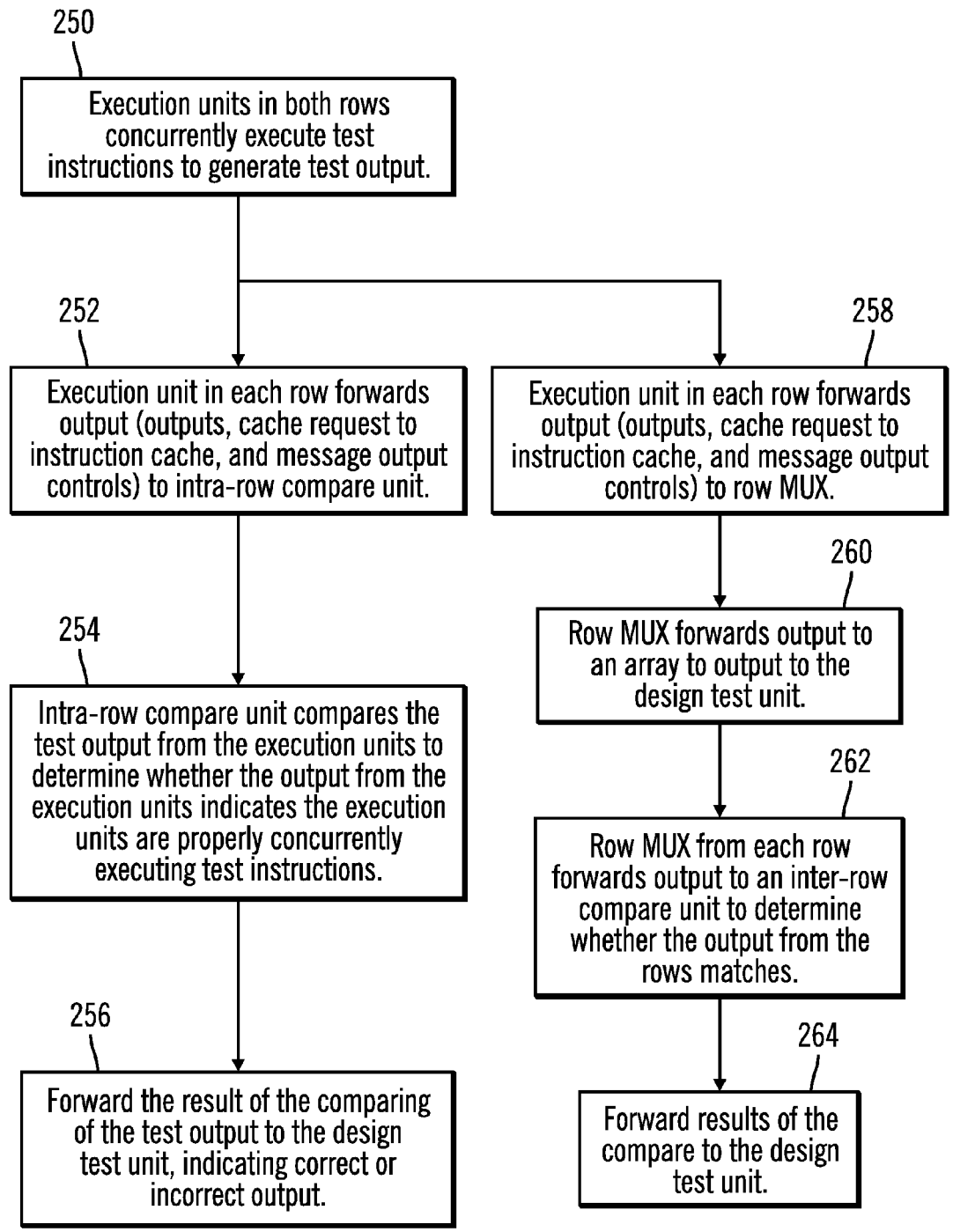
FIG. 6 illustrates an embodiment of operations to check output from execution unites.

FIG. 6 illustrates an embodiment of operations performed by the components of the graphics card 2 to check the results of the operations of the execution units 6*a*, 6*b*, 6*c*, 6*d*, 8*a*, 8*b*, 8*c*, 8*d* during the design test mode. At block 250, the execution units 6*a*, 6*b*, 6*c*, 6*d*, 8*a*, 8*b*, 8*c*, 8*d* in both rows 5*a*, 5*b* concurrently execute test instructions to generate test output, where instructions are processed and output generated in lock-step, such that the execution units 6*a*, 6*b*, 6*c*, 6*d*, 8*a*, 8*b*, 8*c*, 8*d*, when operating properly, execute the same instructions and generate the same output on the same clock cycles. The execution units 6*a*, 6*b*, 6*c*, 6*d*, 8*a*, 8*b*, 8*c*, 8*d* forward (at block 252) output (computational output, cache request to instruction cache, and message output controls) to the intra-row compare unit 204*a*, 204*b* in their respective row 5*a*, 5*b*. The intra-row compare units 204*a*, 204*b* compare (at block 254) the test output from the execution units 6*a*, 6*b*, 6*c*, 6*d*, 8*a*, 8*b*, 8*c*, 8*d* in their row 5*a*, 5*b* to determine whether the output from the execution units for one row indicates that the execution units 6*a*, 6*b*, 6*c*, 6*d*, 8*a*, 8*b*, 8*c*, 8*d* are properly concurrently executing test instructions. The execution units in one row 5*a*, 5*b* are determined to operate properly if their output matches.

The intra-row compare units 204*a*, 204*b* determine if the output they receive from all their execution units 6*a*, 6*b*, 6*c*, 6*d*, 8*a*, 8*b*, 8*c*, 8*d* is the same, i.e., all the output from the row 5*a*, 5*b* matches. In one embodiment, the intra-row compare units 204*a*, 204*b* may determine whether the execution unit output (EU) matches by calculating the result according to equation (1) below:

$$(!(!(EU0+EU1+EU2+EU3)+(EU0*EU1*EU2*EU3)))*\text{data valid} \qquad (1)$$

The output according to equation (1) will fail if the output from one of the execution units in one row 5*a*, 5*b* does not match the output from any of the other execution units in the same row 5*a*, 5*b*. The intra-row compare units 204*a*, 204*b* may use alternative operations and algorithms than shown in equation (1) above to determine whether the output from all the execution units 6*a*, 6*b*, 6*c*, 6*d*, 8*a*, 8*b*, 8*c*, 8*d* in one row 5*a*, 5*b* match.

The intra-row compare units 204*a*, 204*b* forward (at block 256) the result of the comparing of the test output to the design test unit 34, which may indicate that all the output matches, i.e., is correct, or indicate that the output does not match, resulting in an error condition when the output received on one output clock cycle from all the execution units does not match. The execution units 6*a*, 6*b*, 6*c*, 6*d*, 8*a*, 8*b*, 8*c*, 8*d* further forward (at block 258) output to the row MUX 200*a*, 200*b*. The row MUXes 200*a*, 200*b* in each row 5*a*, 5*b* forward (at block 260) the output, or selected output, to the array MUX 206, which in turn forwards the output to the design test unit 34. The row MUX 200*a*, 200*b* from each row forwards (at block 262) the output to the inter-row compare unit 208 to determine whether the output from the rows match. The inter-row compare unit 208 forwards (at block 264) the results of the compare to the design test unit 34. In one embodiment, the inter-row compare unit 208 receives the output from the row MUXes 200*a*, 200*b* on the same clock cycle and determines whether the output matches. In this way, if all the execution units in one row 5*a*, 5*b* produce the same erroneous output, then such output errors may pass the intra-row compare 204*a*, 204*b* operation because they are all the same, but then fail the inter-row compare unit 208, which detects mismatches between the output from different rows.

In certain embodiments, all comparison output is ORed together and sent to designated buffers in the output circuitry 20. For debugging, the output considered from the execution units 6*a*, 6*b*, 6*c*, 6*d*, 8*a*, 8*b*, 8*c*, 8*d* by the intra-row 204*a*, 204*b* and inter-row 208 compare units may comprise the floating point unit (FPU) output and controls, the execution unit message output and control per row, execution unit cache instruction request, address and control, etc.

The described embodiments provide embodiments to perform a clock-by-clock checking operation on output signals from multiple execution units that are intended to perform the same operations, e.g., request instructions, execute instructions, and generate output, on the same clock cycles. Described techniques provide intra and inter row comparing of the output from the execution units to determine if there are errors in the execution unit operations.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

FIG. 1 shows two rows 5a, 5b of execution units. In an alternative embodiment, there may be only one row of execution units or more than two rows of execution units. Further there may be more or less execution units than shown in FIG. 1.

The components shown in FIGS. 1, 2, and 5 may be implemented in hardware logic in circuitry. In alternative embodiments, certain of the components, such as the rasterizers 4a, 4b, 4c and execution units 6a, 6b, 6c, 6d, 8a, 8b, 8c, 8d may comprise processors that execute computer code to perform operations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method, comprising:
activating a design test mode in a graphics module comprising multiple execution units coupled to an instruction cache on a bus, wherein in an operational mode, a host cache is initialized, wherein instructions are provided from the host cache to the instruction cache to provide to the execution units during the operational mode;
configuring the bus to return test instructions from the instruction cache to the execution units in response to a request from one execution unit for the test instructions from the instruction cache in the design test mode, wherein the execution units execute the test instructions during the design test mode;

configuring a bypass during the design test mode to cause test instructions to be transferred to the instruction cache and bypass the host cache; and preventing interrupts during the design test mode.

2. The method of claim 1, wherein the execution units are in a first row of execution units, wherein the instruction cache comprises a first instruction cache and the bus comprises a first bus, wherein the graphics module includes a second row of execution units coupled to a second bus that is coupled to a second instruction cache, wherein configuring the bus comprises configuring the first bus to return test instructions from the first instruction cache to the execution units in the first row in response to a request from one execution unit in the first row for the test instructions from the first instruction cache and configuring the second bus to return test instructions from the second instruction cache to the execution units in the second row in response to a request from one execution unit in the second row for the test instructions from the second instruction cache.

3. The method of claim 1, further comprising:

configuring paths to load test data into the execution units from a design test unit, wherein the configured paths bypass paths used to load data into the execution unit during normal graphics card operations, wherein test data is concurrently loaded over the configured paths to all the execution units.

4. The method of claim 3, further comprising:

configuring the bus to direct output from the execution units during the design test mode to an output buffer for design checking.

5. The method of claim 1, further comprising:

configuring the graphics module to inhibit non-design test mode functions from forwarding data and instructions to the execution units during the design test mode.

6. The method of claim 1, further comprising:

configuring the execution units to concurrently execute same test instructions during a same clock cycle during the design test mode.

7. A system implemented in hardware, comprising:

a bus;

an instruction cache coupled to the bus;

multiple execution units coupled to the bus;

a host cache, wherein in an operational mode, the host cache is initialized, wherein instructions are provided from the host cache to the instruction cache to provide to the execution units during the operational mode;

a design test unit including circuitry enabled to cause operations to:

activate a design test mode;

configure the bus to return test instructions from the instruction cache to the execution units in response to a request from one execution unit for the test instructions from the instruction cache in the design test mode, wherein the execution units execute the test instructions during the design test mode;

configure a bypass during the design test mode to cause test instructions to be transferred to the instruction cache and bypass the host cache; and configure the system to prevent interrupts during the design test mode.

8. The system of claim 7, wherein the execution units are arranged in a first row of execution units, wherein the instruction cache comprises a first instruction cache and the bus comprises a first bus, further comprising:

a second bus;

a second instruction cache coupled to the second bus;

a second row of execution units coupled to the second bus;

wherein the design test unit configures the bus by:

configuring the first bus to return test instructions from the first instruction cache to the execution units in the first row in response to a request from one execution unit in the first row for the test instructions from the first instruction cache; and configuring the second bus to return test instructions from the second instruction cache to the execution units in the second row in response to a request from one execution unit in the second row for the test instructions from the second instruction cache.

9. The system of claim 7, further comprising:

configuring paths to load test data into the execution units from a design test unit, wherein the configured paths bypass paths used to load data into the execution unit during normal graphics card operations, wherein test data is concurrently loaded over the configured paths to all the execution units.

10. The system of claim 9, wherein the design test unit is further enabled to:

configure the bus to direct output from the execution units during the design test mode to an output buffer for design checking.

11. The system of claim 7, wherein the design test unit is further enabled to:

configure the system to inhibit non-design test mode functions from forwarding data and instructions to the execution units during the design test mode.

12. The system of claim 7, wherein the design test unit is further enabled to:

configure the execution units to concurrently execute same test instructions during a same clock cycle during the design test mode.

* * * * *